(12) United States Patent
Balch et al.

(10) Patent No.: US 7,688,431 B1
(45) Date of Patent: Mar. 30, 2010

(54) DISPERSION DEMONSTRATOR FOR EYEWEAR LENSES

(75) Inventors: Thomas A. Balch, Rancho Palos Verdes, CA (US); John M. Tamkin, San Marino, CA (US); Nancy L. S. Yamasaki, Long Beach, CA (US); Jotinderpal S. Sidhu, Irvine, CA (US)

(73) Assignee: Younger Mfg. Co., Torrance, CA (US)

( * ) Notice: Subject to any disclaimer, the term of this patent is extended or adjusted under 35 U.S.C. 154(b) by 0 days.

(21) Appl. No.: 12/421,545

(22) Filed: Apr. 9, 2009

(51) Int. Cl.
*G01B 9/00* (2006.01)

(52) U.S. Cl. ..................... 356/124; 356/127

(58) Field of Classification Search ............... 351/233, 351/205, 200; 356/124, 127
See application file for complete search history.

(56) References Cited

U.S. PATENT DOCUMENTS

| 4,168,912 | A | 9/1979 | Kempf |
| 4,232,968 | A | 11/1980 | Kempf |
| 5,677,750 | A | 10/1997 | Qi |
| 5,889,625 | A | 3/1999 | Chen et al. |
| 6,536,907 | B1 | 3/2003 | Towner et al. |
| 6,604,826 | B2 | 8/2003 | Akiyama |
| 6,665,131 | B2 | 12/2003 | Suzuki et al. |
| 6,851,803 | B2 | 2/2005 | Wooley et al. |
| 6,860,605 | B2 | 3/2005 | Blei et al. |
| 7,075,633 | B2 * | 7/2006 | Wegmann ............... 356/124 |

* cited by examiner

*Primary Examiner*—Hung X Dang
(74) *Attorney, Agent, or Firm*—Sheppard, Mullin, Richter & Hampton LLP

(57) ABSTRACT

The invention relates to an apparatus for comparatively demonstrating the optical properties of eyewear lenses, particularly dispersion. The apparatus includes an illumination source that provides output of shorter wavelength visible light and longer wavelength visible light, a target that creates an image on the light path, a test lens made of eyewear lens material that is illuminated by the light path from the target, and a detector that displays the image acted upon and transmitted through the test lens. The test lens can be interchangeably replaced with another test lens, for comparison of each lens' optical properties. Alternate configurations include multiple light paths, for simultaneous viewing of images through different test lenses.

25 Claims, 3 Drawing Sheets

DISPERSION DEMONSTRATOR FOR EYEWEAR LENSES

BACKGROUND OF THE INVENTION

Eyewear lenses are optical parts for use with the human eye. This may include non-prescription eyewear, such as store-bought sunglasses; safety eyewear, such as spectacles or goggles that protect the eyes; and prescription eyewear prepared with corrective lenses that improve an individual's ability to focus light. Eyewear lenses preferably have an optimal combination of optical and physical properties to suit the user's needs. For instance, someone working with a high speed drill may be very concerned that their eyewear lens is impact resistant, but may not need (or want) tinting that would reduce light transmission through the lens. In contrast, the crew on a professional racing yacht may demand that their eyewear lenses reduce glare and improve their distance vision, but may be less concerned about other attributes. Thus, a broad range of properties may be considered important for various eyewear lenses.

Among the most important optical properties for eyewear lenses are refractive index and chromatic aberration. Refractive index characterizes how much a lens material bends or focuses light, and thus how thin a lens is needed to achieve a given optical power. Therefore, one would typically assume higher index is always better. However, refractive index is not constant with wavelength, and typically increases with decreasing wavelength. Hence, blue light will focus at a different physical distance than red light. This is called longitudinal or axial chromatic aberration. While this generates the rainbow effect we enjoy with a prism, it is problematic in eyewear lenses. In addition, for prescription eyewear that magnifies or reduces an image, one may also encounter chromatic aberration when one looks off-axis toward the edges of the lens. A prescription eyewear lens has different curvatures on the front and back surfaces of the lens, and the difference between these curvatures creates the lens' corrective power. As a result of the different curvatures, the center of the lens will be a different thickness than the edge. When the user looks off-axis, the effect is similar to looking through a tilted and wedged optical element with power. The wedge and tilt components act similar to a dispersive prism, again giving rise to chromatic aberrations. For eyewear lenses, both these types of aberration mean that the focused image will not be as clear or as sharply defined as it would be if all wavelengths of light focused to the same location. This chromatic aberration or dispersion is often perceived as blurring and/or color haloes around a viewed object.

A measure of the degree of chromatic aberration for a material is its Abbe number, $V_x$, expressed by the following relationship of refractive indices ($n_x$) across the visible light region:

$$v_x = \frac{(n_{green} - 1)}{(n_{blue} - n_{red})}$$

For easier and more accurate comparison of the dispersion of different lens materials, the refractive indices used in the equation should be measured at the same wavelengths for each material. In the USA, the convention has been established to use the refractive indices measured at the following specific wavelengths: $n_{green}$=587.56 nm, $n_{blue}$=486.1 nm, and $n_{red}$=656.3 nm, and the resultant Abbe number is referred to as $V_d$. Larger Abbe numbers correspond to less color spread, while smaller numbers indicate more color dispersion.

As one would expect from common experience with prisms, the dispersion effect is more noticeable for higher powered lenses, because edge sections of these lenses have more prism-like structure. Thus, patients with higher powered prescriptions (thicker lenses) may be more susceptible to the blur associated with chromatic aberration. Additionally, some persons may be particularly sensitive to color differences, and may find such dispersion more noticeable. Further, the dispersion is typically larger for higher index materials than lower index materials. Hence, when materials with a higher refractive index are used because dispensers want to create thinner lenses, they may inadvertently subject the wearer to more color and/or blur. Again, this illustrates there may be tradeoffs between lens materials' properties and factors considered important for various wearers.

It has always been a challenge to explain and illustrate these optical concepts effectively to those evaluating eyewear options. While it is easy to show people a rainbow display, the universal response is enjoyment, not concern with how that effect might blur one's vision. One alternative is to approximate what the eye may see via ray tracing and optical modeling with selected variables, and present simulated displays or values based on the theoretical calculations. U.S. Pat. No. 5,677,750 discloses methods that theoretically calculate what the eye views through a lens, assuming certain mathematical equations of the eye's theoretical response, input data or assumed values for the lens, and possible lighting. It also discloses an apparatus (such as a computer display) designed to create a simulation of the retinal image based on these calculations. U.S. Pat. No. 6,604,826 discusses methods and an apparatus to measure or input data from an eyewear lens, combine it with data on the eye's theoretical response, and generate or display theoretical regions that should correspond to comfortable vision based on calculations of specific values of visual acuity. Such techniques may create simulations or computer models that approximate a view through a lens, or may theoretically calculate and display areas that have been defined as clear vision, and then superimpose this model on a framed lens outline. However, people may not understand or trust computer simulations, or may perceive them as interesting games rather than real experiences.

Therefore, it is apparent that a need exists to directly demonstrate how a lens' dispersion may affect one's vision through the lens, by showing images of objects as viewed through the lenses. Ways to simultaneously compare different lenses are also advantageous because our human vision is much better at comparing differences when objects are viewed together, while our visual memory is less discerning. The present invention fulfills these needs and provides for further advantages.

SUMMARY OF THE INVENTION

The present invention resides in an optical system for comparatively demonstrating the optical properties of eyewear lenses, particularly dispersion properties. The optical system of the invention comprises an illumination source with output in at least the shorter wavelength region and the longer wavelength region of the visible spectrum, a target that creates an image on the light path when illuminated by the source, individual test lenses that act upon and transmit the target image and that can be interchangeably positioned in the light path, and a detector to display the image transmitted through the test lens. In preferred embodiments, the illumination source comprises at least some emission in the 380-500 nm region of the visible spectrum, and at least some emission in the 530-780 nm region of the visible spectrum.

In other preferred embodiments, there is at least a local intensity maximum in the range of 400-480 nm, and there may be at least a second local maximum in the 540-750 nm range.

In a preferred embodiment, the optical system further comprises an optical sub-assembly to approximately collimate the light from the source before it reaches the test lens. The test lens may be illuminated off-center or off-axis, to further demonstrate its dispersion effects.

In another preferred embodiment, the optical system comprises multiple separate light paths and test lenses.

In a preferred embodiment of the invention, the optical system comprises an illumination source with output in at least the shorter wavelength region and the longer wavelength region of the visible spectrum, a target that creates an image on the light path when illuminated by the source, a beamsplitter that divides the light path into at least a first light path that illuminates a first test lens, and a second light path that illuminates another test lens, and detector(s) that displays the image viewed through each of the test lenses. Separate detectors may be used for each divided light path, or in another preferred embodiment, the same detector is used as the detector of both the first and second light paths. In a further preferred embodiment, after illuminating the test lenses, the two light paths are recombined by use of a second beamsplitter that overlaps the first and second light paths into a combined beam before the detector. The light path(s) may be folded to reduce the space needed to illuminate and display the image through the test lens.

The test lenses may comprise different optical properties from each other, and may include the same or different eyewear lens materials, coatings or treatments. In preferred embodiments, photochromic or linearly polarized test lenses are used. In another preferred embodiment, other test lenses may be interchanged in the position of the previous test lenses to compare sequentially each test lens' effects on the target image.

Other features and advantages of the present invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS

The present invention is embodied in optical systems that comparatively demonstrate various optical properties of eyewear lenses, particularly dispersion of the lenses. The optical systems illuminate the lenses with visible light, project an image through an eyewear lens, and present the image for viewing by an observer. In one preferred embodiment, the optical system includes optical elements to approximate normal constraints and responses of the human eye with an eyewear lens. In another preferred embodiment, the optical system illuminates at least two test lenses in comparable light paths, for comparative viewing. The comparative viewing system may preferably either contain optical elements to approximate normal constraints of the human eye's view through each test lens, or more preferably, contain optical elements that make it easier for the viewer to perceive the chromatic differences between the test lenses. In addition, for convenience of use, the optical system may contain optical elements that minimize the total size of the demonstrator.

To provide a more convincing dispersion demonstrator for the viewer, the optical system preferably allows test lenses to be interchangeably positioned in the light path. The test lenses preferably are interchangeably positioned in the light path such that any distance and/or lens orientation is equivalently maintained, or can be adjusted to maintain equivalent positioning within the light path, such that the pointing and display position of the total light path is or can be adjusted to remain approximately constant.

In a preferred embodiment, the optical system that illuminates at least two test lenses in comparable light paths may be constructed such that the two test lenses may be interchanged between the light paths. In another preferred embodiment, the optical system may be constructed such that each of the test lenses may be individually accessed and replaced by another test lens, which may be the same as one of the previous test lenses, made of a different lens material, or comprise additional lens coatings or treatments for comparison with the other test lens(es).

The preferred embodiments will now be described with respect to the drawings. To facilitate the description, any numeral identifying an element in one figure will represent the same element when used in any other figure.

Figure 1:
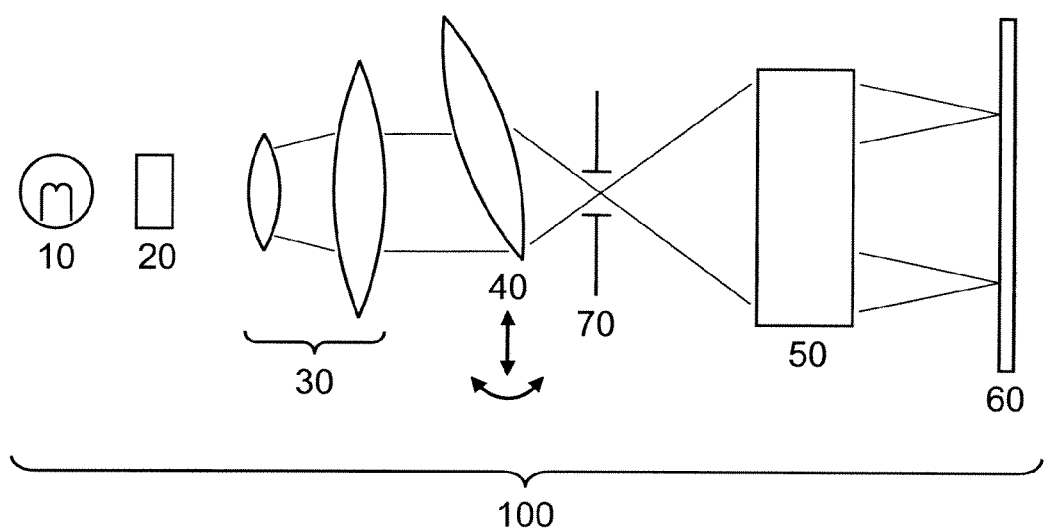
FIG. 1 shows an exemplary optical system for a dispersion demonstrator of the present invention that accommodates an individual test lens.

FIG. 1 shows a schematic of an exemplary optical system 100 of the present invention that accommodates an individual test lens. As an overview, illumination source 10 is positioned to provide sufficient lighting of target object 20 such that the image of target 20 is conveyed on the light path through test lens 40 and is visible at the other end of the optical system via detector 60 that displays the transmitted image. Preferably, before the test lens, the conveyed image and light path are approximately collimated, and may be preferably enlarged, by optical sub-assembly 30. After the test lens, optical sub-assembly 50 conveys the image and light path, and enlarges or reduces the conveyed image as needed to fit the display of detector 60.

Depending on other elements in the optical light path, and the final viewing environment of the dispersion demonstrator, illumination source 10 can be constructed in many different ways. One requirement of illumination source 10 is that its spectral emission contain at least some energy toward both ends of the visible spectrum, that is, some emission in the approximately 380-500 nm region and some emission in the approximately 530-780 nm region, in order to show the effect of the refractive index change with wavelength (chromatic dispersion). Preferably, the illumination source will have at least some spectral emission in or near the blue region of the spectrum (that is, between about 380 nm and 480 nm) and some spectral emission in or near the red region of the spectrum (that is, between about 620 nm and 750 nm). In another preferred embodiment, the illumination source will have at least a local intensity maximum in or near the blue region between about 400 nm and 480 nm, and at least a second local maximum at a measurably longer wavelength in the visible region. Each of these peak intensities may be either local maxima, or global maxima for the light source. More preferably, the second at least local intensity maximum occurs between about 540 nm and 750 nm.

The illumination source may have spectral emissions at other visible light wavelengths, and the source's spectrum may optionally extend into the ultraviolet (UV) or infrared regions. Emissions at other wavelengths in the visible spectrum may provide different color balance to the illuminant. For example, one may choose a source that approximates a blackbody or graybody emitter, with emission across most of the visible region and therefore a fairly white appearance to the observed light. An incandescent lamp is one example of such a graybody source. Additional emission in the UV or infrared region may be used to expand the demonstrator's capabilities, for instance, to use the source to activate photochromic eyewear lenses (that typically darken with UV light), or to address an observer's questions about UV or infrared transmittance of the lenses.

The illumination source may also comprise other light sources that contain discrete emission lines. These emission lines are often caused by energy transfer of excited atomic or molecular species, and therefore have more defined color to their illumination, or with multiple emissions, a colored tinge to a "white" light. Such light sources include, for example, discrete monochromatic laser sources, LEDs (light-emitting diodes), fluorescent lamps, plasma sources and gas emission lamps.

Depending on their emission spectra, light sources may be used alone or in combination with each other as the illumination source 10. For instance, one might use red and blue LEDs together, or red, blue and green LEDs, to illuminate the optical system. One could also use multiple visible wavelength lasers, or tunable lasers set to different wavelengths. It may also be possible to use ambient lighting, such as sunlight or room lights, as the source 10, if sufficient ambient light can be propagated through the optical system. Other lamps and light sources may be used in combination to alter the spectral distribution of illumination source 10.

One exemplary, preferred illumination source is a "white" LED. The small size, low heat output, and good brightness of such lights are convenient for practical optical designs. In addition, while they contain broader emission across the visible wavelength region, they often have some additional emission lines that can be used to advantage in the present design. For example, the inventors found that a white LED showing broadband emission across the visible spectra and another at least local maximum in the blue region made it easier to see the chromatic aberration effects. This is likely due to the light source providing sufficient light in both the red and blue regions to demonstrate the difference between the refractive indices for these respective wavelengths of visible light. The exemplary light source that the inventors used showed abroad peak in intensity near about 540 nm, and a local maximum from an additional, narrower emission peaked near about 450-460 nm (i.e., within the blue region of the visible spectrum) with a FWHM (full width at half maximum) bandwidth of about 20-30 nm. Those knowledgeable in the art will understand that other light sources with emissions at other peak locations than this exemplary source can be used, but it is preferred that the light source shows some emission in or near the blue region, and additional emission at measurably longer wavelengths.

The inventors surprisingly found that seemingly small shifts in peak wavelength for the broadband, longer wavelength emission may also make it significantly easier to see the chromatic aberration associated with an eyewear lens. For example, the broadband emission for the exemplary "white" LED used above extended from about 420 nm to 750 nm with a local maximum in the blue region near 450-460 nm, and the peak of its broadband emission near about 540 nm. AR (antireflective) coated optical elements were used and are preferred in the optical system 100 to reduce visible light loss from reflection off the surfaces of the optics. However, the inventors found that the particular AR coatings used in one experimental arrangement shifted the peak intensity of the longer wavelength broadband emission from about 540 nm to about 575 nm or about 590 nm, depending upon which coated optical elements were used. While illumination with any of these three spectral distributions (i.e., with a local maximum in the blue region, and its broadband emission peaked at 540, 575 or 590 nm, respectively) clearly showed the effects of chromatic aberration in the projected image through a test lens, the color haloes and blur of the image were most obvious when illuminated with the light peaked near 590 nm. This confirms that having an illumination source 10 with more intensity shifted toward the red end of the spectrum, in combination with some blue light emission, is one preferred choice to show the dispersion based on refractive index differences at more disparate wavelengths.

The illumination source 10 should provide relatively uniform illumination of the target 20. Therefore, if multiple discrete sources, such as multiple lights or LEDs are used, their light should preferably be combined prior to illumination of the target. This can be accomplished, for example, with technologies such as the optical mixing rods used with fiber optics. One example of such rods is ORA (Optical Research Associates, Pasadena, Calif.) Rippled Mixer technology. Another alternate approach is to reflect multiple sources off mirrors and adjust the pointing of the mirrors such that each beam is combined along a common optical light path.

Optional additional optical elements, not shown in FIG. 1, may be used in combination with the illumination source 10 to tailor or control its output. These include bandpass filters, cutoff filters, and neutral density filters, among others.

Target 20 is an object that when illuminated by source 10 creates an image that can be conveyed along the light path. Preferably, it will be composed of transparent and opaque features to create a clear and distinct image. In FIG. 1, the optical light path is shown in transmission through target 20, but it is within the scope of the invention to use a reflective target, or alternately, a mirror in combination with a transmissive target 20, and adjust the light path accordingly to convey a reflected image through the subsequent optical elements.

The features of target 20 can be chosen for aesthetics as well as optical performance. For instance, one may choose to use alphanumeric symbols or the "tumbling E" series commonly associated with an eye chart. Alternately, one may use a resolution target commonly composed of closely spaced lines in series of increasing size, and interspersed numerical series in vertical columns. An example of such a resolution target with horizontal and vertical lines as well as numerical symbols of various sizes is the USAF 1951 resolution target. Other symbols, scenes or sequences may also be selected.

For approximating human visual response, the minimum size of any detail of a feature should not be smaller than about 1 minute of arc. This corresponds to a 5 µm image on the human retina, and is approximately the limit of the eye's resolution. A "tumbling E" on the 20/20 line of an eye chart subtends about 5 arc minutes, giving a full image on the retina of about 25 µm. For reference, the symbols on the 20/20 line of an eye chart are approximately 8.8 mm in height and are read at a distance of 20 feet (6096 mm). One can then scale the target size, in combination with any magnifying effects of the optical system, to give a comparable effective image.

Another more pragmatic approach to determining target size is to illuminate a target containing multiple characters of increasing sizes and determine experimentally, by viewing final images at the display of detector 60, what character size is effective to see the images and the chromatic effects with a given optical system. In this instance, one may use an actual test lens, or preferably, a test lens with good optical quality and a known Abbe number that is higher than that of the planned final test lenses. Examples of high Abbe number lenses include a high quality fused silica lens of equal power to the planned test lenses, or a plastic test lens with a higher Abbe number than the planned test lenses. For example, if test lenses with Abbe numbers in the range of about 20-50 are to be demonstrated in the optical system of the invention, a plastic test lens made of hard resin material such as CR-39 (registered trademark of PPG Industries) with an Abbe number of 58 could be used for this experiment to determine target size. Too small a target feature will be below the eye's resolution in the resultant image, even with a test lens of known high Abbe number. Conversely, since the chromatic effects arise because the different wavelengths of light are focusing to different locations in space, too large a target feature may physically obscure the chromatic effects. In this instance, the large features of this target 20 may act as a chromatic spatial filter that physically blocks from view some of the effects of the chromatic refractive index differences. Between these two sizes will be a preferred size for target features.

The 1951 USAF resolution target containing both numbers and horizontal and vertical lines was a convenient pattern used for initial evaluation of the optical systems of this invention. Surprisingly, the inventors found that a column of numbers rather than a series of either horizontal or vertical lines gave an image that allowed more discernment of chromatic aberration. This is interesting, because often lens wearers' report color haloes to be particularly visible on straight vertical features. It is possible that blurring of the numbers may be easier for a viewer to recognize quickly, since they know a priori exactly how that shape should appear. In contrast, with a random line-like shape, the viewer may incorrectly assume that any variations seen were intentional rather than the effects of chromatic aberration. It is also possible that the combination of both horizontal and vertical known features in a single target image, as would be seen for most numbers, provides additional registration clues to the viewer to determine if the image is clear or blurred.

Other recognizable images could also be used effectively for target 20. For instance, a standard logo or pattern of words and shapes can be used successfully for the image target. As an example, the inventors experimented with a transmissive target with black-line features of the Younger Optics' logo that contains the words "Younger Optics" and horizontal, closely spaced lines emanating from a stylized lens shape. The first exemplary logo target was produced by exposing photographic film to create the features desired. However, the exposure was not optimal and the outlines of the features were blurred and uneven. This target could not provide a clear image for use in the invention. A second logo target was made by etch removal of chrome on glass. The features in this case had very clean, even, sharp edges. This target gave an image via the optical system of the invention that was more easily and clearly focused and allowed much easier discernment of chromatic effects. This illustrates that many different targets may be used, but for any target, it is preferable to have clear, well-defined features with sharp edge detail.

Sub-assembly 30 is an optional component that comprises optical elements to convey the light to the test lens. Preferably, the sub-assembly improves the collimation of the beam that will intersect the test lens. It is possible to use highly collimated illumination sources, such as lasers for example, in which case further collimation may be unnecessary. However, many typical sources are point sources, or produce an expanding beam of light. For efficient light usage, and more consistent control of the light path, it is preferred in such instances to further collimate the beam with sub-assembly 30. If desired, this sub-assembly may also comprise optical elements to reduce or magnify the light beam. The sub-assembly is preferably constricted from achromatic optics, so that it does not introduce false bias or color errors into the light path that could be wrongly interpreted as effects of the test lens. Preferably, the optical elements of sub-assembly 30 are also AR coated. This is preferred to reduce stray reflections in the optical system, and to make the best use of the illumination source output so that higher powered, more expensive and/or bulkier sources are not required.

The light path next intersects the test lens 40. The test lens is comprised of material established or considered for use in eyewear lenses. This can include glass and plastic materials commercially available for eyewear lenses, as well as materials being developed and tested as possible candidate lens materials. Examples of commercial plastic materials include optical-grade polycarbonate, hard resin such as CR-39 (a registered trade name of PPG Industries Ohio, Inc.), poly-urea/urethanes such as Trivex (a registered trade name of PPG Industries Ohio, Inc., and sold by Younger Mfg. Co. under the registered trade name Trilogy), and polythiourethanes such as MR-10 (trade name of Mitsui Chemical Co., Inc.). Other established eyewear materials include fused silica and high index glasses. Candidate eyewear lens materials often focus on improved optical or physical properties, such as higher strength, impact resistance, light weight, ease of forming to optical power and high refractive index.

The test lens should have an optical power different from zero. As discussed previously, higher powered lenses show the chromatic aberration more readily because they are more prismatic and a wide range of lens powers can be selected for test lens 40. Interestingly, the inventors found that viewers could discern chromatic aberration with this invention with test lenses even of modest power, such as +2 Diopters. Of the population requiring corrective lenses, approximately 67% require powers of 2 Diopters (plus and minus) or less; the other 33% require even higher powered corrections. Thus, the average viewer will immediate understand that a test lens of 2 Diopters is a typical corrective power, and not an exception to what they may experience. This may be persuasive when demonstrating the chromatic effects via the present invention. Alternately, one might choose other, higher powered test lenses to demonstrate the invention to other lens wearers. For instance, nearly 84% of all eyewear prescriptions are encompassed within the range of +3 Diopters to −3 Diopters, while nearly 92% of all prescriptions fall within the range of +4 Diopters to −4 Diopters. Thus one can reasonably consider test lenses of other power ranges for practical use in the invention's optical system.

Either plus or minus powered lenses may be used as test lenses in the invention. Minus powered lenses may require additional magnifying optics to enlarge the image in optical system 100. Preferably, plus powered test lenses are used, because the plus power configuration creates a magnified image and therefore requires less additional optical elements in the optical system 100. Similarly, while not required, it is preferable to use only symmetric, spherically powered test lenses (without cylindrical correction), made without atoric or aspheric surfaces. This eliminates the complication of confusing optically introduced off-axis or lateral power differences, and corrections caused by the lens' asphericity, with the effects caused by the refractive properties of the lens material.

The test lens may be a clear, uncoated lens to allow assessment of only the Abbe number differences of the base lens material. Alternately, the lens may include other common features or optional additional features of eyewear lenses to more closely replicate various actual lenses the observer might wear. For instance, the test lens may include hard coats similar or identical to those commonly used on eyewear lenses. The lens may also be AR coated, to assess the effect of that added feature. Options can be added alone or in various combinations. As examples of some of the optional additional features, the test lens can be treated or coated to be UV-attenuating, mirror coated or reflective, tinted, photochromic and/or polarized to demonstrate lens performance for these more specialized configurations. With any of these or similar options, the spectral transmission of the lens may be changed, and the effect of this change upon one's perception of dispersion can then be demonstrated.

In the case of polarized lenses, it is more preferably to maintain a known orientation of the test lens' polarizing axis with respect to the optical light path of the system. Depending on the optical elements and their various coatings, the light path may be non-polarized, or more likely, unintentional or partially polarized. If the optical system is truly non-polarized, then less emphasis need be placed on careful orientation of a polarized lens within the system; however, fully non-polarized light paths are quite rare. Thus, maintaining a known orientation for each test lens with respect to the light path will ensure a more accurate comparison of each sample. Another option that may be used in this invention is to polarize the light path intentionally. For instance, if a linearly polarized test lens will be used, a separate linear polarizer may be added in the light path, preferably just before the test lens, to ensure that all the light striking the test lens has a known polarized orientation. In this case, it will still be important to maintain a known orientation of the test lens with respect to the beam for reproducibility.

Another optional embodiment with a polarizing test lens is to use the orientation of its polarizing axis to maximize or reproducibly control throughput on polarized or the commonly partially polarized light sources. For instance, one could adjust the orientation of a polarized test lens with a marked or known polarizing axis to optimize the light output of the optical system and then maintain that orientation for each test lens for reproducible, repeatable measurements.

In another embodiment of the invention, the test lens 40 may be tilted with respect to the through axis of the optical light path to further demonstrate the prismatic effect of the lens. This tilt may mimic a lens in a wrapped frame design, for example. Preferably, such lens tilt is between about 0-20° (absolute tilt angle, i.e., in either the plus or minus direction) from a line perpendicular to the light path.

In another embodiment of the invention, the test lens can be offset, as shown in FIG. 1, such that the optical light path does not pass through the center of the powered lens. Again, this means the lens interacts with the light path more prismatically, and this orientation can show the chromatic aberration effects more readily. The offset test lens is analogous to looking toward the side while wearing eyeglasses. Common eyewear lenses range from about 30 mm to over 60 mm wide, which can accommodate significant offset in viewing. Lenses in eyewear frames typically are positioned about 12-16 mm in front of the eye, and looking straight ahead in normal daylight, the eye views through a circular area of about 4 mm diameter. Even a very slight movement of the eye could displace this position several millimeters to either side. For example, gazing just 30° to the side displaces the viewing position of the eye about 12-15 mm across the surface of the lens. Thus, if optical system 100 is designed to mimic normal constraints of eyewear use, the test lens 40 may preferably be offset on the light path by 0-20 mm to illustrate normal viewing behavior.

Interestingly, the inventors found that while the test lens may be optionally tilted or offset, tilt or offset was not required with the invention's optical systems in order to discern the chromatic aberration effect. The elements of the invention's optical systems combined to give a light path and image that could demonstrate the differences between test lenses with different Abbe numbers even when these test lenses were centered on the optical light path.

In a preferred embodiment of the invention, test lens 40 may be removed from optical system 100 and an alternate test lens substituted in its place for comparative demonstration of each lens' chromatic effect. Preferably, the test lenses will have the same power, and sufficiently similar dimensions (e.g., diameter, shape, thickness, etc.) that the same holder or an identical duplicate holder can be used for this exchange. The ability to compare various test lenses in the same optical system is one advantage of the present invention, because the viewer can directly see that the same system has acted on each lens. Thus, lenses with different Abbe numbers can be directly demonstrated. In addition, test lenses with other optical properties may be demonstrated. For example, test lenses of identical lens materials and powers, but with different coatings, or with different treatments to affect their interaction with light (for example, tinted, mirrored, polarized, photochromic, etc.) can be compared with the invention's optical system.

In a preferred embodiment, the holder for test lens 40 and optical system 100 will be designed so the viewer can easily remove and replace the test lenses, to confirm any chromatic aberration observed, or re-examine similarities or differences between the images generated by different test lenses.

An optional element in optical system 100 is a limiting aperture 70 positioned at the focal plane of the test lens 40. This aperture can be included, for example, to mimic the field of view at the eye, namely, approximately 4 mm in diameter. A limiting aperture may also be used in general to control the beam size of the light path.

Sub-assembly 50 is an optional element that comprises optical elements that magnify or reduce the conveyed image from the test lens 40 so that it is correctly sized to fit on detector 60 and be visible to the viewer. While this option may not be required with all optical systems, it is preferred to better utilize the display area, and allow more flexibility in the comparison of test lenses. Sub-assembly 50 is preferably constructed from achromatic optics, so that false bias or color errors are not introduced into the light path by these optical elements, and wrongly interpreted as effects caused by the test lens. Preferably, the optical elements of sub-assembly 50 are also AR coated to reduce stray reflections, and optimize use of the illumination source output.

Detector 60 senses and displays the conveyed image, as acted upon by test lens 40, to the viewer. It may include a direct or indirect display of the image transmitted through the test lens. For example, detector 60 may be a screen on which the image is directly intercepted and reflected back toward the viewer, like an old-fashioned slide show. In another embodiment of the invention, detector 60 may be a rear projection screen, such as flash opal or a diffuser that allows one to look backward along the optical light path and view the image as it is transmitted toward the viewer. Alternately, detector 60 may comprise a detection device that collects and/or converts intercepted signals to an associated, indirect display of the detected image. As examples, possible detectors and their associated indirect displays are conventional cameras and their developed or projected images, digital cameras and their viewing screens, and detector arrays and accompanying displays. In a preferred embodiment, sub-assembly 50 may focus the conveyed image onto the CMOS array of a digital camera coupled to an LCD display. In another example, detector 60 may be a detector array or a camera array linked to a computer display or other large screen displays.

In a preferred embodiment of the invention as mentioned previously, test lenses can be interchangeably substituted in the optical system 100. This embodiment is particularly advantageously used with a camera display, so that any color or imaging bias of the camera is equally applied to all compared test lenses.

Interestingly, the inventors found that when using a camera and its display as detector 60, it may be preferable to use a black and white camera instead of or in addition to, a color camera. With a color camera and its display for detector 60, the viewer may wonder if the image has been enhanced by the color rendering capabilities of the camera. The exchange of test lenses in a common optical system addresses this concern. In addition, the inventors also found that when a black and white camera display was used, the degree of blur on the images may in some instances be more noticeable than when the same images were viewed in color. This difference in discernment could easily be affected by factors such as ambient lighting, or the camera's attributes (such as resolution, color pixellation, color purity, hue, etc) causing less sensitivity to color progressions than to sharper gradations from black to white. The option to interchangeably convert from color to black and white displays may be another preferred embodiment, particularly when one is first demonstrating the chromatic effects via the invention.

The optical system shown in FIG. 1 that accommodates an individual test lens may also be duplicated or replicated to allow multiple test lenses to be simultaneously compared. For example, multiple single path demonstrators may be placed side-by-side and equipped with various test lenses for direct comparison. Care should be taken to closely match the components of each optical system, particularly the light sources, detectors and any coated optical elements, to minimize spectral variations between the systems that are not based on test lens differences. This can be judged, for example, by placing the same test lens sequentially in each optical system and measuring the results, or placing precisely matched test lenses in each optical system and simultaneously comparing the results. If unacceptable differences are noted, then individual optical elements in any given optical system can be replaced for better consistency between the optical light paths.

Figure 2:
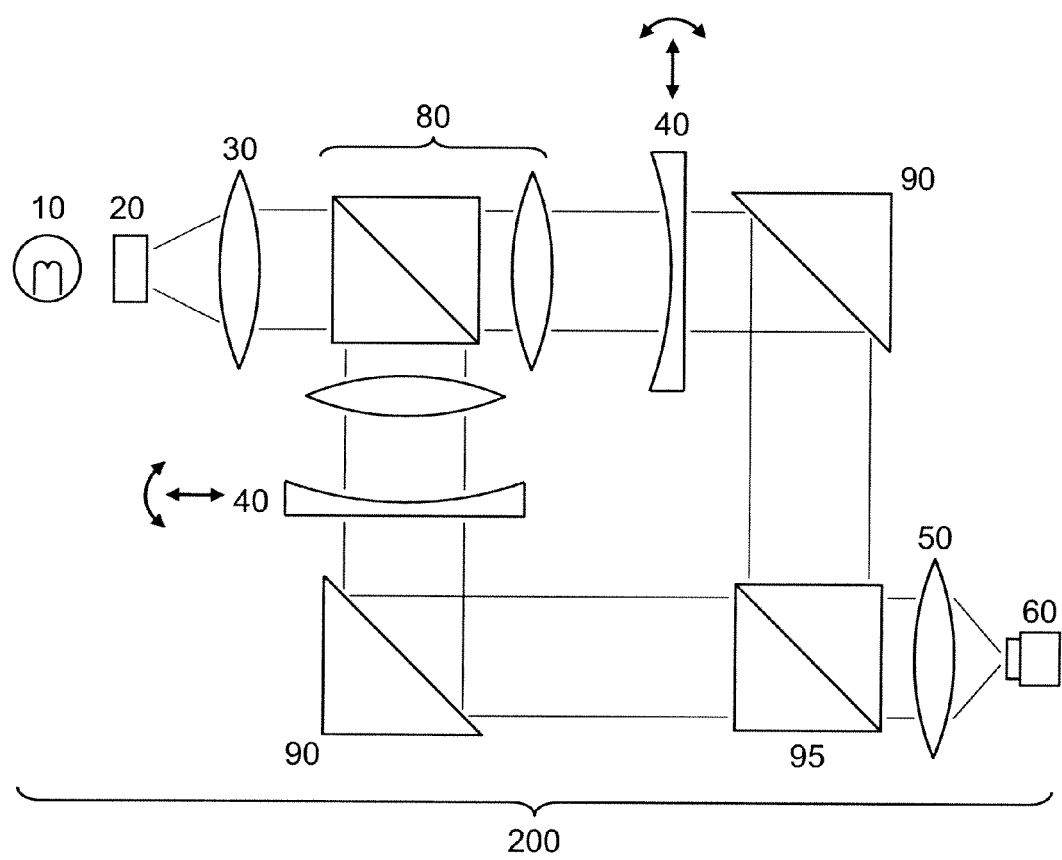
FIG. 2 shows an exemplary optical system for a dispersion demonstrator of the present invention that intersects two test lenses simultaneously.

FIG. 2 shows another preferred optical system 200 for a dispersion demonstrator of the present invention, in which the light from a single source and target is conveyed through two test lenses simultaneously for direct comparison of each test lens' chromatic aberration. In this embodiment, illumination source 10 is positioned to provide sufficient lighting of target object 20 such that the image of target 20 is conveyed on the light path through each of two test lenses 40, and the image formed through each test lens is visible at the other end of the optical system at the display of detector 60. In the exemplary embodiment of optical system 200, the light path is preferably collimated and may be preferably enlarged, by optical sub-assembly 30, before being split into two channels by the splitting optical sub-assembly 80. The light from each channel created by sub-assembly 80 is conveyed through each of the test lenses (40). In this exemplary embodiment, reflectors 90 are optionally used to redirect the beam into the re-combining optical sub-assembly 95. Preferred optional optical sub-assembly 50 conveys the images from each test lens 40 along the re-combined light path, and enlarges or reduces the conveyed image as needed to fit the display of detector 60.

Several optical elements of the embodiment shown in FIG. 2 were described in detail with respect to the exemplary embodiment of the invention shown in FIG. 1. The illumination source 10, target 20, optical sub-assembly 30 and optical sub-assembly 50 function as described previously to convey the light and the chosen target in a (preferably) approximately collimated beam along the light path. In this embodiment, before the light path reaches the test lens, it is divided into two channels by splitting optical sub-assembly 80. This can be done by various combinations of optics, filters, and partial or total reflectors. In a preferred embodiment, the splitting sub-assembly may comprise a beamsplitter filter to reflect part of an incident light beam in one direction, and transmit another portion of the incident light in a second direction. One exemplary form of such beamsplitters comprises a neutral-density filter placed at 45° to the incident light path to direct some light, by specular reflection, at 90° to the original beam direction, and allow another portion of the incident beam to pass directly through the filter. This generates two beams of light from the original source, propagating at 90° to one another. Plate beamsplitters may be used in this embodiment, but may require optical or positional correction of the light path displaced by passage through the thickness of the beamsplitter. Preferably, a beamsplitter cube is used (as shown schematically in FIG. 2), comprising two wedge-shaped surfaces with the beamsplitter filter positioned at 45° to the incoming light. The beamsplitter cube is preferred because the optical path lengths remain the same along the two arms of the assembly, minimizing alignment offsets. Preferably, the outer surfaces of the cube are AR coated to minimize stray reflections. The cube may also comprise spectral rejection or band pass filters to tailor the light throughput. In a more preferred embodiment, the beamsplitter is achromatic.

The splitting optical sub-assembly 80 may direct the light from the incident beam with equal or different intensity along each created, split path. In a preferred embodiment, a 50:50 beamsplitter is used to keep the light paths approximately equal in intensity. If non-equal paths are created, further optical elements or filters may be needed to better match the light intensity or the spectral distribution of light along each path.

In an alternate preferred embodiment, two unequal light paths can be employed as a chosen feature of this optical system to show simultaneously how different lighting conditions (e.g., intensity, polarization and/or spectral distribution) can affect the images of the test lenses. This ability to demonstrate the effect of different lighting conditions is more effective in the dual path embodiment of optical system 200, because a viewer will see the images of both test lenses simultaneously, rather than trying to remember a sequential change for a single test lens system. As with optical system 100, this alternate preferred embodiment of unequal light paths can be used to compare lenses of the same materials and powers that possess different additional optical properties, or to compare lenses of known but different Abbe numbers, or different optical powers.

In a preferred embodiment, the optical system 200 will be designed to allow interchange of the test lenses between the light paths, so the viewer can compare any differences caused by the lighting conditions on each test lens.

The splitting sub-assembly may optionally comprise additional optical elements, if needed, to magnify or reduce the beam size, or to correct for changes in optical power or offset of light paths through optical system 200. Such correction may be preferred or needed, for example, if the test lenses 40 are to be placed at a tilt or offset in a translational direction with respect to each optical light path, or if test lenses with different optical powers are to be compared. Alternately, the additional optical elements of sub-assembly 80 may be individually selected to alter their respective light paths in terms of intensity or spectral distribution to either match the two optical light paths, or create controlled but dissimilar optical light paths for illumination of the test lenses.

In optical system 200 two test lenses 40 are illuminated simultaneously. Several of the features and optional attributes of the test lens 40 and its holder have been described previously. The test lenses may be identical in power and lens material, or may be different. Preferably, the test lenses will be of known optical power, so the other optical elements of the light paths in system 200 can be properly chosen to focus or project the test lens' image.

In optical system 200, it is preferable to be able to interchangeably position each test lens in the two light paths. This is particularly preferred when each test lens is of a different lens material with a different Abbe number, so any effects or questions about the effects, of the two light paths can be directly viewed.

In another preferred embodiment, each test lens 40 that will be compared simultaneously will be of approximately the same optical power so that similar optical elements can be used in each light path, and the final images conveyed through the lenses will be of comparable size. Alternately, if test lenses of different, but known optical power are to be compared, the optical elements, or adjustments of the elements, of each split light path can be specified to accommodate the expected powers.

While optical system 200 only illuminates two test lenses at a time, it is clear that one could have multiple test lenses, and substitute them in pairs, serially, or sequentially into the two or more test lens locations for various comparisons of different test lens properties. As an example, for an optical system 200 with light paths designed for a single known lens power, one could start with a test lens of Abbe number 30 in one path, and a test lens with Abbe number 45 in the other path, and compare the appearance of the target images created by each test lens. Then one could exchange the test lenses between the two light paths. One could also place identical test lenses in each path to check for any differences between the light paths. For another example, one might remove the test lens with Abbe number 45, and replace it with a test lens of Abbe number 58. As another example, one might substitute test lenses with and without various AR or mirror coatings or other lens treatments that alter other optical properties (such as, for example, photochromics, polarizers, or tint), to see what (if any) effect such coatings and treatments have on the final target images. These comparisons can be made using test lenses of the same power and lens material in each path to judge just the effect of the different treatments or coatings, or using test lenses of the same power but different lens materials in different paths to demonstrate the combined effects of both lens materials and other treatments or coatings.

Similarly, as an example of testing with an optical system 200 that accommodates lenses of different known powers, one could place test lenses with the same Abbe number but two different powers in the separated light paths, and view how the power of the lens alone affects the resultant image. Then one test lens could be replaced with another lens of a different Abbe number. Such operations with the demonstrator of the invention may be helpful to show the viewer at what Abbe number or at what optical power they become more sensitive to chromatic aberration.

The orientation of the test lens 40 relative to the light paths in system 200 can also varied. As mentioned previously, tilted or offset test lenses may be used to more readily demonstrate the effects of dispersion. These may either be at set values of tilt or displacement, or the system may be equipped for variable changes in these parameters. In a preferred embodiment for ease of optical design, and reproducible use, the optical system 200 will be designed with one or more pre-determined, fixed positions of tilt and/or offset of each test lens 40. Such operations with the demonstrator of the invention may be helpful to show the viewer at what angle or viewing position they become more sensitive to chromatic aberration.

Interestingly, the inventors found that it was not required to offset or tilt the test lenses in order to perceive differences in the images simultaneously presented by a demonstrator designed according to optical system 200 when test lenses of different Abbe numbers were used. Even at relatively low optical powers (for example, +2 to +3 Diopters), chromatic differences and blur in the conveyed images were seen when test lenses were illuminated on center. This demonstrates the presence of longitudinal chromatic aberration, which is also a function of dispersion or Abbe number. This option of on-axis alignment with the light path is another preferred embodiment because of its simplicity, robustness and better error tolerance of the optical system.

The discernible differences between lenses of even low power were an unexpected result of the inventors' experimentation. It was at first thought that one must use high powered lenses (more prismatic cross-sections) in order to perceive differences in the materials' Abbe numbers. Higher-powered test lenses may be more preferred when the test lenses are placed in an offset or tilted orientation with respect to the optical light path, to accentuate the prismatic effects that also demonstrate Abbe number differences. In contrast, for on-axis illumination (with the light path approximately centered through the lens) the light is mainly acted upon by the inherent Abbe number of the lens with little additional prismatic enhancement. On-axis, higher powered lenses have sharper focusing zones, with less separation between the red and blue focal distances than for lower powered lenses. For instance, a +2 Diopters lens of polycarbonate (with a relatively low Abbe number, $v_d$, of 31) shows a difference in focal distance of 14.5 mm between the focus of 486.1 nm light and 587.6 nm light; while a +4 Diopters polycarbonate lens has only a spread of 7.2 mm between the same two frequencies of blue and yellow-orange lights. Thus with a difference in focal position of over half an inch for a +2 Diopters lens, it may be easier with the present invention to see that the image is indeed blurred, especially in the optical system 200 that allows simultaneous comparison.

Optional optical elements 90 in optical system 200 comprise reflective optics to redirect the light toward the display. They are used in exemplary optical system 200 to reduce the overall size of the demonstrator, and direct both test lenses' images onto a single display. Optical elements 90 preferably comprise high quality mirrors, more preferably, with spectrally neutral high reflective front-surface coatings. In the configuration shown in FIG. 2, the mirrors are optimized for high reflection at 45°. Preferably, optical elements 90 are achromatic, particularly if they comprise optical power. In one preferred embodiment, elements 90 are well-matched in optical and spectral properties such that they do not further change the optical characteristics of their respective light paths. Elements 90 may be mounted on adjustable stages, such as x-y tilt mounts, for fine tuning the direction of their reflected beam.

In a preferred embodiment, optional optical sub-assembly 95 recombines or overlaps the two light paths to allow each conveyed image to be presented on the same display in optical system 200. The re-combining sub-assembly is similar to sub-assembly 80, but with the light paths reversed: sub-assembly 80 separated a single incoming beam into two beams, while sub-assembly 95 re-combines two beams into one. This recombination can be accomplished by various assemblies, including mirror systems and combination reflection and transmission systems. In a preferred embodiment, the sub-assembly 95 comprises a "beamsplitter" that acts in this configuration as a recombinant filter. One exemplary form of such beamsplitters comprises a filter placed at 45° to each of two orthogonal incident light paths, which transmits some light directly through the filter, and by specular reflection, direct the second beam of incident light at 90° to its original direction, along the same path as the transmitted beam. Preferably, this type of beamsplitter is configured as a beamsplitter cube (as shown schematically in FIG. 2) with the beamsplitter filter positioned at 45° to the incoming light. The beamsplitter cube is a preferred element because stray reflections are minimized by the controlled filter coatings on the interface wedge and the outer surfaces of the cube. These coatings typically include AR properties and may also include rejection filters. In a more preferred embodiment, the beamsplitter is a 50:50 filter and spectrally neutral, so that sub-assembly 95 does not significantly affect the intensity and appearance of the conveyed images.

Optional optical sub-assembly 50 and detector 60 function as described previously, but in optical system 200, present the conveyed image from each test lens to the viewer. This optical system advantageously allows direct comparisons of two test lenses simultaneously. As described above, the system 200 may be preferably and advantageously designed for interchange of test lenses in the two light paths, or for substitution of different test lenses in each path.

Alternate optical systems within the scope of the invention would comprise the elements of at least an illumination source, a target, a test lens and a detector with its display, but could include different elements, or multiples of various elements described in FIG. 1 and FIG. 2. One of skill in the art would recognize such variations, substitutions, or other changes to accommodate design considerations. For instance, one could construct an optical system that divides the light path as in optical system 200, but in which sub-assembly 80 creates two adjacent parallel paths such that the images are still displayed or projected together. In another embodiment based on the concept of system 200, two separate displays could be used following the test lenses, instead of re-combining the light path with elements 90 and 95.

Another embodiment could use a series of more than one beamsplitter at splitting sub-assembly 80, dividing the light paths into additional beams for illumination of more than two test lenses at once. For example, a 67:33 beamsplitter could be used for the first element in sub-assembly 80, and then on the reflected light path, an additional 50:50 beamsplitter be used to create three optical light paths for simultaneous comparison of three test lenses in this embodiment. Multiple re-combining sub-assemblies could be used to combine the light paths for a single display, or multiple displays could be used for simultaneous viewing of the images through the test lenses. One of ordinary skill would quickly recognize how to continue to apply this concept for simultaneous illumination and viewing of conveyed images through additional test lenses.

Another embodiment of the invention could use a pulsed or periodically sampled source 10 that illuminates the target, and then is directed by a stepping or positionable optical sub-assembly to send discrete pulses or light samplings along different optical light paths to multiple test lenses. For example, the positionable sub-assembly could comprise a stepper-motor driven turning mirror that sequentially reflects the original light beam to multiple fixed mirrors that redirect each beam to a test lens. The image created by each lens could be displayed sequentially on one display, or on multiple displays as they appear.

In another embodiment of the invention, the light source may include visible light, or both UV and visible light output that can be selectively directed through the system to further show effects of discrete wavelength ranges on the test lenses. Selective direction of different portions of the spectra can be accomplished, for example, by using filters that can be placed into and removed from the light path. Another method may be to use pulsed source(s) that supply different wavelength regions sequentially.

In one preferred embodiment with selectively directed light, photochromic test lenses are used. UV light may first be directed through the optical system to activate the photochromic dyes, and then visible light or selected wavelengths of visible light directed through the activated lens to show the dispersion effect in a darkened state of the test lens. Similarly, different selected wavelength regions of light may be directed through photochromic lenses to show at what wavelengths they activate.

In a multipath or replicate path embodiment of the invention, selective light direction along different optical paths may allow direct comparison of the effects of different wavelength regions on matched or comparative test lenses as well. This might be used, for example, to illustrate the effects on chromatic aberration caused by the spectral distributions of different types of light sources (e.g., filtering the illumination source(s) to approximate sunlight on one light path and fluorescent lighting on another light path). In another exemplary embodiment, one could demonstrate the effects of additional lens treatments, such as photochromic dyes, by using selectively different wavelength distributions along multiple light paths. As an example, matched photochromic test lenses could be used, but one could direct non-activating light along one path, and light in a wavelength range that will activate the photochromics along another path to show how the lenses change. Each light path may also simultaneously or sequentially contain visible light with a spectral distribution that will show dispersion—or any differences in dispersion—in both the activated and non-activated photochromic test lenses. In another exemplary embodiment with comparative test lenses, a photochromic test lens of a given lens material can be placed in one path and a clear test lens of the same lens material can be placed in another path. Both paths can continuously contain light that will show dispersion effects according to the invention. However, the path with the photochromic lens may either continuously or at intervals also contain light that will activate the photochromic dyes, so that an observer may look for effects due directly from photochromic changes.

These additional variations and alternate configurations are not comprehensive of all possible embodiments, but provide further examples that one skilled in the art would recognize within the scope of various embodiments of the invention.

The invention will now be described in more specific detail with reference to the following non-limiting examples.

Example 1

The optical system arrangement was similar to that illustrated in FIG. 2. A 3-color LED (Luxeon III LED and Fiber coupler, Optical Research Associates, Pasadena, Calif.) illuminated a positive 2" by 2" glass slide 1951 USAF resolution target (Edmund Scientific). The group 4, elements 2, 3 and 4 lines and numerals were selected as the image and centered in front of the LED light beam, and the remainder of the slide was blackened. The light beam after passing through the resolution target was approximately collimated with a 50 mm f.l. achromatic doublet (Edmund Scientific, N32-323) that enlarged the beam to approximately 10 mm diameter. The optical beam then was directed via a 50:50 visible beamsplitter cube (CVI Melles Griot, 03BTF154) to create two light paths that proceeded at right angles to each other. A test lens of a given optical power was placed in each light path, and could be controllably positioned to either center the light path through each lens, or provide a known offset in angle (approximately 1-20 degrees) and/or distance across the lens (approximately 0.2-20 mm displacement possible). When the inventors' introduced an offset in angle or distance for one test lens, they were careful to introduce the same offset in position for the other test lens. After the light path traversed each test lens, each light path impinged upon a 45° reflector, positioned as shown in FIG. 2, element 90. Each of the two reflectors was mounted on x-y adjustable mounts to aid in aligning the outgoing light paths. These outgoing light paths were directed onto two perpendicular faces of a second 50:50 visible beamsplitter cube, such that the two light paths would be overlapped into a combined beam as they left the beamsplitter. The overlapped beam (with its images of the target as conveyed by each individual test lens) was re-imaged by a 50 mm achromatic doublet (Edmund Scientific, N32-317) to a diameter of 12.5 mm, such that the entire beam would be intercepted by the detector CMOS array of a camera system and displayed on its small screen (Winplus, BT13107-1). The camera was operated in both color and black and white display modes.

Two identical lenses were first placed in each of the two light paths. These test lenses were surfaced from spherical Trilogy (registered trade name of Younger Mfg. Co.) lenses that display an Abbe number of 45. The lenses were surfaced to +2 Diopters of optical power, and edged to 60 mm diameter rounds.

By moving a small white card along each light path, the inventors traced the light beam that traversed each separate test lens. Small alignment adjusts were then made to the mounts of the optical elements to ensure that both light paths were approximately centered on the perpendicular faces of the second beamsplitter, and sufficiently overlapped as they exited the second beamsplitter. The overlapped beams were focused onto the camera detector. By sequentially blocking each separate light path, the inventors confirmed which test lens created which image on the detector, and then performed further fine positioning adjustments of the optics mounts to ensure that both images were visible on the display simultaneously.

When these final adjusts were completed, very similar images were observed from each test lens, consisting of the lines and numbers of the resolution target.

Example 2

The optical assembly of EXAMPLE 1 was used, except that one of the Trilogy test lenses was replaced with a +2 Diopters, spherical polycarbonate lens, with an Abbe number of 31, edge to a 60 mm diameter round. Thus, the demonstrator presented a direct comparison of two lenses with different Abbe numbers: 31 for the polycarbonate lens and 45 for the Trilogy lens. Again, the light paths through each lens were aligned without any tilt of the lens, but in this Example, the light paths were each offset 12 mm from the center of each lens. The light paths were traced and optics aligned so the images were well-overlapped at the detector.

The images as observed on the display consist of: vertical lines in groups of three stacked in a vertical column and increasing in size up the column, small numbers in a vertical column adjacent to the vertical lines, and a larger number "2" at the top of each image. The lager number "2" is a designate number associated with this small-sized series of images on the USAF resolution target.

Figure 3:
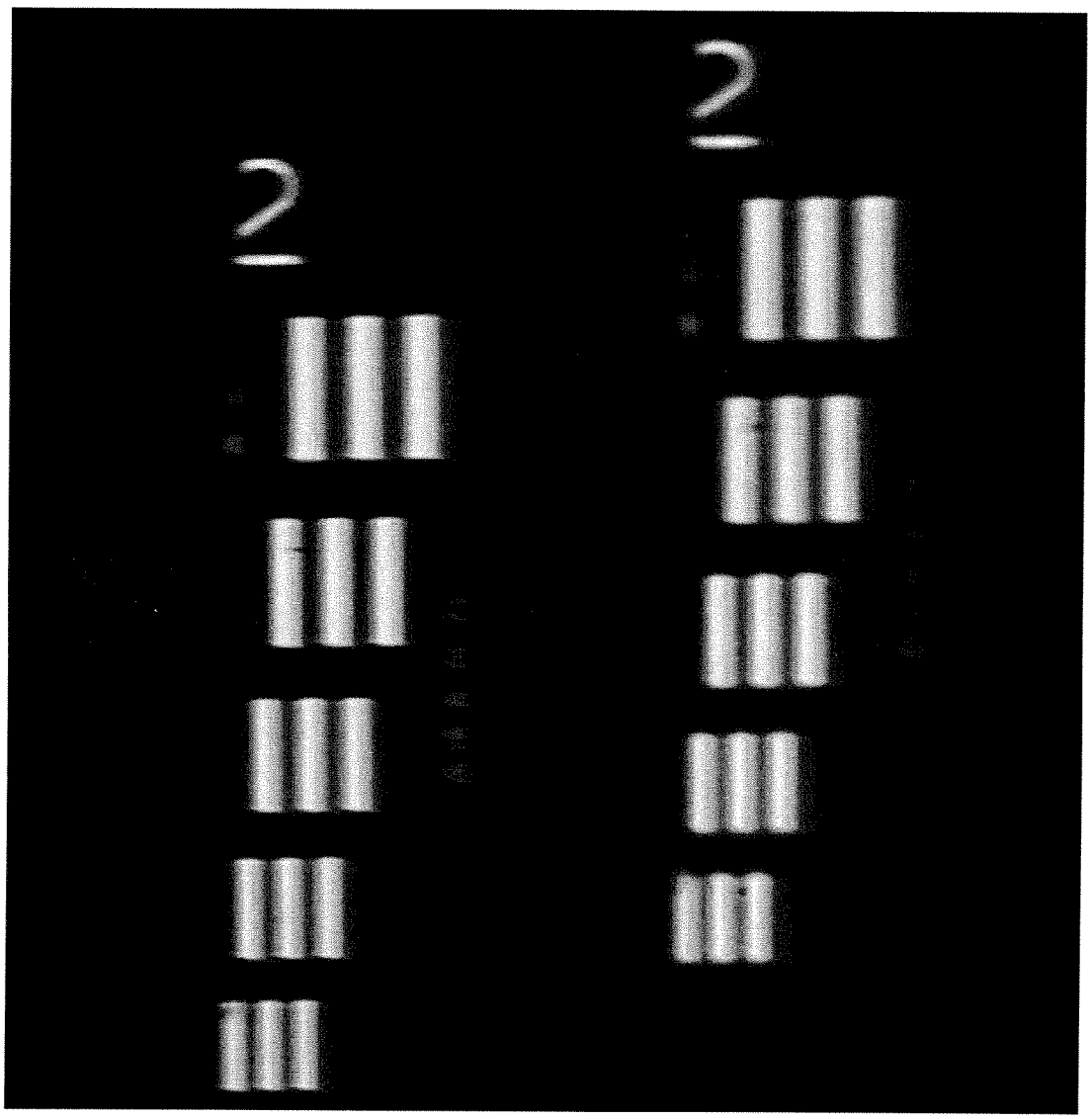
FIG. 3 shows exemplary images viewed through two test lenses having different Abbe numbers.

FIG. 3 shows a black and white photograph of the display observed through each test lens. With a black and white image, the effect of chromatic aberration will appear as blur or gray scale differences on the images. With test lenses of different Abbe numbers but equal optical power, this is due to the fact that the different light frequencies passing through a lens with a lower Abbe number are focused at greater distance from each other than for the lens with the higher Abbe number (a lens with less dispersion). The blurring occurs because some wavelengths are likely focusing shorter than the detector's image plane, and some are focusing beyond the plane.

In FIG. 3, the image created by the polycarbonate, lower Abbe number test lens is on the right and appears slightly higher on the display than the image created by the Trilogy test lens on the left. While some features on each image are still at the limit of resolution, there are several features in each image that can be used to compare the chromatic aberration or dispersion of each test lens. One can quickly see that the number "2" is clearer at the top of the column for the Trilogy lens than for the polycarbonate lens. Similarly, the right-angled outline of the vertical lines is more easily seen for the image generated through the Trilogy lens than for the polycarbonate image. The lines as generated through the polycarbonate lens appear to have blurred, rounded edges. Another indication of this blurring effect due to chromatic aberration is seen within discrete groups of three lines. Looking at the topmost group of three lines, one can see a wider, darker separation between these three lines for the image created by the Trilogy lens than for the image created by the polycarbonate lens with its lower Abbe number. Looking sequentially down the vertical columns at the other groups of three lines, one can similarly see that while the separation between lines becomes smaller as one descends through the column, the separations are always more distinct for the Trilogy lens' image than for the polycarbonate lens. Next to the second and third groups of three lines, as counted from the top of each column, is seen another small vertical column. In the image created by the Trilogy lens, it is just possible to discern that these are numerals, descending in the order 2, 3, 4, 5 and 6.

This column of numbers is indistinguishable in the image on the right, created by the polycarbonate test lens with a lower Abbe number.

Example 3

The optical system described in EXAMPLE 1 was used, with the two test lenses of EXAMPLE 2. In this experiment, each +2 Diopters test lens was positioned such that the light path was offset 20 mm from the center of each lens. Neither lens was tilted. In this Example, the column of numerals adjacent to the column of lines in the number "2" USAF target was used as the image, and the rest of the resolution pattern was blacked out. The lens 50 was adjusted to increase the magnification of these images onto the camera detector display. The camera was operated in color display mode.

Again, the image created by the polycarbonate, lower Abbe number test lens was positioned to the right side of the display, and the image through the Trilogy lens was observed to the left. In color display mode, the numerals showed distinct color banding, with a red image appearing slightly to the left-hand side of each numeral, then yellow and green, and a blue image to the right-hand side. On the display, it was clearly apparent that the distance separating the different color bands was demonstrably larger for the images created with the lower Abbe number polycarbonate lens than for the corresponding images created by the Trilogy lens with an Abbe number of 45. In addition, the image features or numeric outlines were consistently sharper as viewed through the Trilogy lens than for the polycarbonate lens.

Although the invention has been disclosed in detail with reference to preferred embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawings herein. Accordingly, the invention is identified by the following claims.

What is claimed is:

1. An apparatus for comparatively demonstrating optical properties of eyewear lenses comprising:
    an illumination source that comprises at least some emission in a first wavelength range of 380-500 nm and at least some emission in a second wavelength range at measurably longer visible wavelengths;
    a target that creates an image on a light path when illuminated by the illumination source;
    a first test lens comprising an eyewear lens material, wherein the first test lens is illuminated by the light path from the target and transmits at least some of the light path, and wherein the first test lens can be interchangeably replaced in the light path by a second test lens; and
    a detector of the light path that displays the target image transmitted through the first or second test lens to allow sequential comparison of the first test lens' effect on the target image and the second test lens' effect on the target image.

2. An apparatus as defined by claim 1, further comprising an optical sub-assembly that approximately collimates the light from the target before it reaches the first test lens.

3. An apparatus as defined by claim 1, wherein the illumination source's emission in the second wavelength range comprises at least some emission in the range of 530-780 nm.

4. An apparatus as defined by claim 3, wherein the illumination source's emission in the second wavelength range comprises an at least local maximum in emission between about 540 nm and 750 nm.

5. An apparatus as defined by claim 3, wherein the illumination source's emission in the first wavelength range comprises an at least local maximum in emission between about 400 nm and 480 nm.

6. An apparatus as defined by claim 3, wherein the first test lens is positioned such that the light path illuminates the first test lens off-center.

7. An apparatus as defined by claim 3, wherein the first test lens is tilted at an absolute angle of 0-20 degrees from a line perpendicular to the light path.

8. An apparatus as defined by claim 3, wherein the second test lens comprises different optical properties than the first test lens.

9. An apparatus as defined by claim 8, wherein the second test lens comprises a different eyewear lens material than the first test lens.

10. An apparatus as defined by claim 8, wherein the second test lens comprises a coating.

11. An apparatus as defined by claim 3, wherein the second test lens comprises a photochromic lens.

12. An apparatus as defined by claim 3, wherein the second test lens comprises a linearly polarized lens.

13. An apparatus as defined by claim 3, further comprising:
    a first beamsplitter positioned between the target and the first test lens to divide the light path into at least a first light path and a second light path;
    a third test lens comprising an eyewear lens material, wherein the third test lens is illuminated by the second light path from the target and transmits at least some of the second light path;
    a second detector of the second light path that displays the target image transmitted through the third test lens.

14. An apparatus as defined by claim 13, wherein the first and third test lenses are positioned such that the first and second light paths illuminate the first and third test lenses off-center.

15. An apparatus as defined by claim 13, wherein the first test lens is tilted at an absolute angle of 0-20 degrees from a line perpendicular to the first light path, and the third test lens is tilted at an absolute angle of 0-20 degrees from a line perpendicular to the second light path.

16. An apparatus for comparatively demonstrating, optical properties of eyewear lenses comprising:
    an illumination source that comprises at least some emission in a first wavelength range of 380-500 nm and at least some emission in a second wavelength range of 530-780 nm;
    a target that creates an image on a light path when illuminated by the illumination source;
    a first beamsplitter positioned after the target to divide the light path into at least a first light path and a second light path;
    a first test lens comprising an eyewear lens material, wherein the first test lens is illuminated by the first light path from the beamsplitter and transmits at least some of the first light path;
    a second test lens comprising an eyewear lens material, wherein the second test lens is illuminated by the second light path from the beamsplitter and transmits at least some of the second light path; and
    a detector of the first and second light paths that displays a target image transmitted through the first test lens and a target image transmitted through the second test lens, to allow comparison of the first and second test lenses' effect on the target image.

17. An apparatus as defined by claim 16, further comprising an optical sub-assembly that approximately collimates the light from the target before it reaches the first beamsplitter.

18. An apparatus as defined by claim 16, further comprising a second beamsplitter positioned after the first and second test lenses, and configured to overlap the first and second light paths into a combined beam that is presented to the detector.

19. An apparatus as defined by claim 16, further comprising a third test lens that can interchangeably replace the first test lens for sequential comparison of each of the test lens' effects on the target image.

20. An apparatus as defined by claim 19, wherein the third test lens comprises different optical properties than the first test lens or the second test lens.

21. An apparatus as defined by claim 19, wherein the first, second or third test lens comprises a photochromic lens.

22. An apparatus as defined by claim 19, wherein the first, second or third test lens comprises a linearly polarized lens.

23. An apparatus as defined by claim 16, wherein the first and second test lenses are positioned such that the first and second light paths illuminate the first and second test lenses off-center.

24. An apparatus as defined by claim 16, wherein the first test lens is tilted at an absolute angle of 0-20 degrees from a line perpendicular to the first light path, and the second test lens is tilted at an absolute angle of 0-20 degrees from a line perpendicular to the second light path.

25. An apparatus for comparatively demonstrating optical properties of eyewear lenses comprised of at least two optical systems, each optical system comprising:
- an illumination source that comprises at least some emission in a first wavelength range of 380-500 nm and at least some emission in a second wavelength range of 530-780 nm;
- a target that creates an image on a light path when illuminated by the illumination source;
- a first test lens that comprises an eyewear lens material, wherein the first test lens is illuminated by the light path from the target and transmits at least some of the light path, and wherein the first test lens can be interchangeably replaced with a second test lens that comprises an eyewear lens material; and
- a detector of the light path that displays the image transmitted through the first or second test lens.

* * * * *